May 11, 1943.  G. CHRISTENSON  2,318,757
PACKING
Filed March 5, 1940
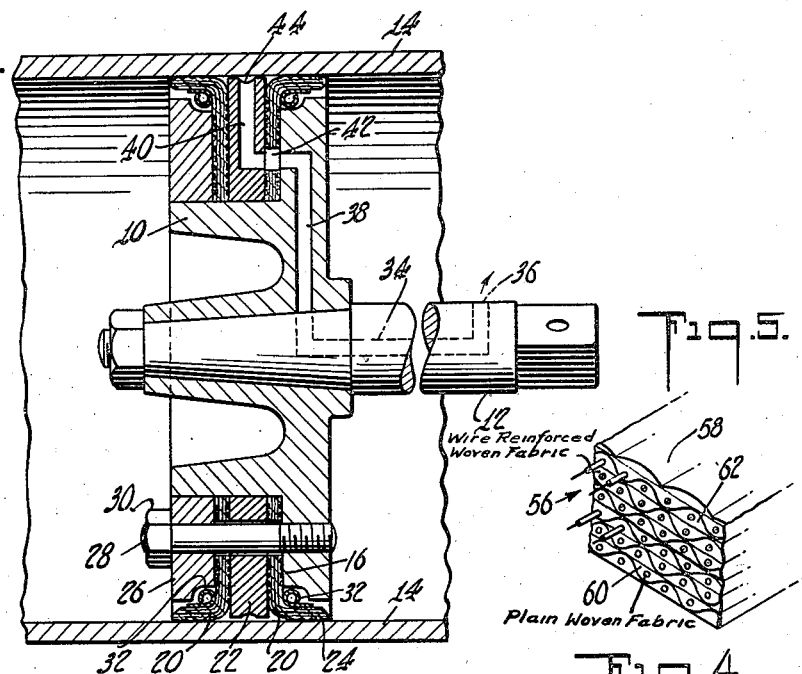
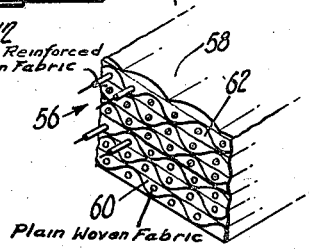
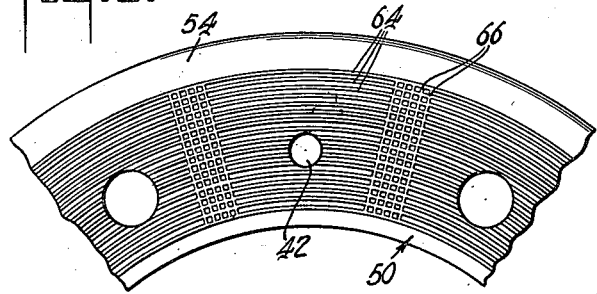
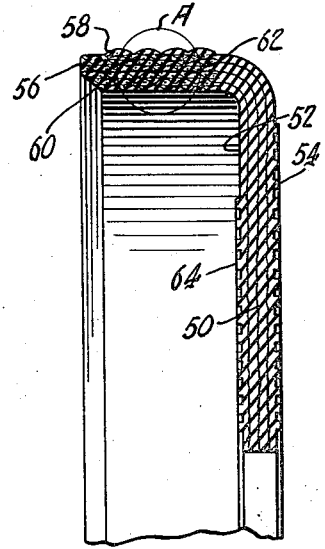
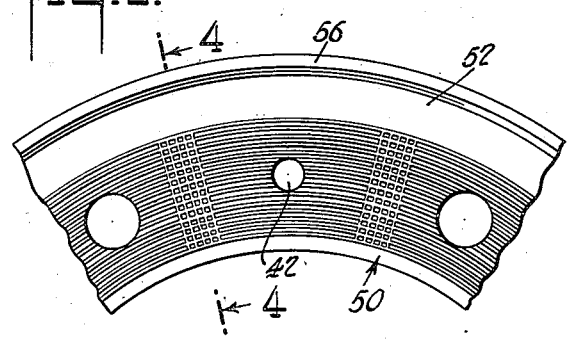
INVENTOR.
George Christenson
BY Virgil E. Kline
ATTORNEY.

Patented May 11, 1943

2,318,757

UNITED STATES PATENT OFFICE 2,318,757

PACKING

George Christenson, Plainfield, N. J., assignor to Johns-Manville Corporation, New York, N. Y., a corporation of New York Application March 5, 1940, Serial No. 322,282

7 Claims. (Cl. 309—33)

The present invention relates to cylinder and piston assemblies, and particularly to those applicable to power reverse gear mechanisms, air brake mechanisms and the like. The invention is more particularly concerned with an improved packing to be employed in such cylinder piston assemblies.

Cylinder and piston assemblies of the type referred to above now conventionally include a packing having a base resting upon the piston head and an out-turned lip or flange for sliding and sealing engagement with the cylinder wall. Packings of this description are normally referred to as "cup packings" and such terminology will be hereinafter employed. The cup packing is retained in position on the piston head by means of a keeper ring and a plurality of bolts or studs extending through the keeper ring and the base of the cup packing, and into the piston head.

The principal object of the present invention is to provide an improved cup packing having greater resistance to wear, and hence, longer life than those heretofore employed.

Another object of the invention is the provision of a cup packing adapted to achieve the above-referred to desideratum by means of an inner, more compressible and fluid-impervious layer, and an outer harder wear-resistant layer.

A further object of the invention is the provision of an improved cup packing including means to insure an air-tight seal between the piston head or other element of the piston assembly, and the base of the cup packing.

A still further object of the invention is the provision of a cup packing as referred to above, which will insure against air or other fluid from passing from the cylinder at one side of the piston to the other.

My invention will be more fully understood and further objects and advantages thereof will become apparent when reference is made to the more detailed description thereof which is to follow and to the accompanying drawing, in which:

Fig. 1 is a fragmentary sectional view of a piston and cylinder assembly including the cup packing of the instant invention;

Fig. 2 is a fragmentary inverted plan view on an enlarged scale of a portion of a cup packing of the invention;

Fig. 3 is a fragmentary plan view on an enlarged scale of a portion of a cup packing of the invention;

Fig. 4 is an enlarged sectional view taken on the line 4—4 of Fig. 3; and

Fig. 5 is an enlarged detail view of the portion of the packing indicated at A in Fig. 4.

Referring now particularly to Fig. 1, there is disclosed a piston cylinder assembly of generally conventional design. The assembly includes a double acting piston 10, carried by a piston rod 12, adapted for reciprocation within a cylinder 14. The piston 10 has a head or seat 16 on which rests a cup packing 20. Resting on the cup packing is an annular separator ring 22, which supports a second cup packing 20. The two packings 20 have their lips or flanges 24 oppositely directed as indicated. A keeper ring 26 is seated upon the second cup packing, and bolts or studs 28 extend through the keeper ring 26, spreader ring 22 and packings 20, and are in threaded engagement with the piston head 16. The bolts or studs carry nuts or heads 30, which as the bolts are tightened up, are in jamming engagement with the keeper ring to maintain the several elements of the piston in firmly assembled relationship. The flanges or lips of the cup packings are forced outwardly against the piston walls by expander rings 32 of any suitable type.

A piston assembly of the type with which the present invention is particularly concerned, includes a bore 34 in piston rod 12, one end of the bore being in communication with the atmosphere outside of the cylinder, as indicated at 36, and the other end positioned to communicate with a passageway 38 in the piston head 10. Passageway 38 connects with a radially extending passageway 40, in connector ring 22, through a perforation 42 in the cup packing adjacent the piston head. Passageway 38 opens into a groove 44 formed in the periphery of the separator ring.

The connecting passageways as above described, are provided to permit the escape to the atmosphere of air or other fluid acting upon, or acted upon by, the piston which may seep past the lips of the cup packings. The passageways thus vent the peripheral space between the lips of the packings. By this means, air or other fluid which may leak past the lip of either of the packings passes to the atmosphere, rather than continuing past the other cup packing and to the cylinder at the opposite side of the piston.

Referring now particularly to Figs. 1, 4 and 5, a cup packing 16 is depicted embodying the features of the instant invention, and particularly adaptable for use in a piston and cylinder assembly of the type heretofore described. The cup packing comprises a base 50, having an inner face 52, an outer face 54, and an upstanding lip or flange 56 with an outer face 58, adapted for sliding and sealing engagement with the cylinder wall. The cup packing is composed of a plurality of layers of fabric impregnated with a material such as a rubber composition, and welded into a substantially unitary homogeneous body by molding under heat and pressure. To provide the yieldability necessary for the flange 56 to conform with the normal irregularities of the cylinder walls to reduce leakage past the flange to the minimum, and at the same time to provide for resistance to wear and deterioration in service to an extent not heretofore possible, the several fabric layers adjacent opposite faces of the packings are of different characters. Thus, in accordance with the preferred form of the invention, the fabric layers 60 adjacent the inner surface of the cup are of conventional type, comprising preferably a woven asbestos fabric suitably impregnated with a material such as a rubber composition. The fabric layers 62 adjacent the outer surface of the cup however, are composed of intercrossed strands of wire-reinforced yarn. This yarn comprises in its preferred form, a core formed of one or more strands of very fine, preferably brass wire, around which is wrapped or "doubled" fibrous strands, preferably asbestos, but which also may be cotton fibres or the like, or mixtures of the different fibres. The wire-reinforced fabric is impregnated with a suitable rubber or similar composition, similarly as the fabric layers 60, and the several layers are joined by molding under heat and pressure into a substantially integral body, as previously referred to.

The wire-reinforced fabric layers 62 provide a relatively hard wear-resistant surface, enabling the cup to give satisfactory service for periods not heretofore possible. At the same time the relatively yieldable more conformable character of the inner layers 60 of substantially conventional construction, impart to the entire cup the necessary yieldability and conformability, to permit the expander ring 32 to hold flange or lip 56 in tight engagement with the cylinder wall. Thus, by combining the two types of fabric in the manner described, increased length of service is obtained without loss of effectiveness of sealing action between the cup lips or flanges and the cylinder walls.

In the operation of piston cylinder assemblies of the type here specifically considered, namely, those in which a vent is provided for the peripheral space between the packing flanges, difficulties have arisen in securing a sufficiently tight fit between the faces 52 and 54 of the packings, particularly the innermost packing including the aperture 42, and the piston head and separator ring, to prevent fluid penetrating between the smooth shanks of bolts 28 and the walls of the somewhat enlarged perforations in the keeper ring, etc. through which the shanks pass, from finding its way to the escape vent at aperture 42, with consequent loss of pressure from the head end of the cylinder. This difficulty is due to the inevitable inequalities in the large flat surfaces of the piston head, separator plate, and/or keeper plate, and is accentuated in the instant case by the relatively unyielding character of the fabric forming the outer layers of the cup packing.

In accordance with the instant invention, this difficulty is overcome by providing preferably both faces 52 and 54 of the cup packing base with a plurality of concentric ribs 64, and transversely extending cross ribs 66 (see particularly Figs. 2, 3 and 4), the ribs 64 and 66 being of the same height. These ribs, which may be formed during the molding action and are preferably substantially entirely composed of the rubber or similar composition serving as the impregnant for the fabric layers, greatly reduce the area of contact of the cup packing base and the piston or piston element, with the result that the packing relatively readily conforms with the surface of the piston or piston element. In other words, the numerous relatively narrow, compressible ridges may be easily forced into contact with the piston elements over the entire extent of the ridge surfaces, by tightening of the bolts 28. The cross ribs 66 are located, at least on both sides of perforation 42, to completely dam the grooves between the ridges, and prevent the air or fluid entering the grooves at the bolt openings from reaching the perforations 42. Hence, this arrangement provides for the desired intimate association between the cup base and the piston or piston element throughout their contiguous areas, while at the same time, sealing off the grooves.

Although the cross ridges have been found to be essential only for the cup packing which includes the perforation 42, they are suitably formed in all the cup packings to provide for interchangeability, and the necessity of stocking only one type. The concentric and cross ribs are as indicated above, particularly advantageous when employed in combination with a cup packing having the wire-reinforced outer fabric layers, inasmuch as such layers are even less conformable with the inequalities of the piston head than conventional types.

Having thus described my invention in rather full detail, it will be understood that these details need not be strictly adhered to, but that various changes and modifications will suggest themselves to one skilled in the art, all falling within the scope of the invention as defined by the subjoined claims.

What I claim is:

1. A cup packing for assembly with a reciprocable piston including surfaces confining a portion of the cup packing therebetween, said cup packing comprising a base composed of fabric and a yieldable plastic impregnant, to be confined by said surfaces, and a peripheral upstanding lip for sliding and sealing engagement with the cylinder wall, a venting means including an aperture in said base, concentric ribs extending from the faces of said base to reduce the area of contact of said surfaces and faces, and transverse ribs damming the valleys between said concentric ribs at opposite sides of said aperture, said transverse and concentric ribs being composed substantially entirely of said plastic impregnating material.

2. A piston assembly comprising a piston head including a flat annular surface, a cup packing having a base resting on said surface, a ring overlying said base, bolt means extending through aligned perforations in said base and ring, and in threaded engagement with said head, and a venting means including an aperture in said base, said base having concentric ribs extending from the faces thereof and in contact with said surface and said ring, and transverse ribs damming the valleys defined by said first-mentioned ribs at both sides of said aperture.

3. A piston assembly comprising a piston head including a flat annular surface, a cup packing having a base resting on said surface, and a retaining ring overlying said base, bolt means extending through aligned perforations in said base and ring and in threaded engagement with said base, a venting means including an aperture in said base, and said base being composed of fabric impregnated with deformable plastic material, and having concentric ribs extending from the faces thereof and in contact with said surface and said ring, and transverse ribs damming the valleys defined by said first-mentioned ribs at both sides of said aperture, said ribs being composed substantially entirely of said deformable plastic material.

4. A cup packing comprising a base portion and an upstanding peripheral lip including a surface for sliding and sealing engagement with a cylinder wall, said cup packing including a layer adjacent said surface comprising a wire-reinforced fabric composed of yarns including a metal core member and a fibrous covering, and a yieldable rubber-like impregnant, and an inner layer substantially integral with said first-named layer, and comprising asbestos fabric and a yieldable rubber-like impregnant.

5. A cup packing comprising a unitary body including a base portion and an upstanding peripheral lip, said body comprising an outer portion including a plurality of layers of wire-reinforced fabric composed of yarns including a metal core member and a fibrous covering, and an inner portion composed of non-reinforced asbestos fabric, said body carrying a yieldable rubber-like impregnant.

6. A cup packing for assembly with a reciprocable piston including surfaces confining a portion of the cup packing therebetween, said cup packing comprising a unitary body including a base to be confined by said surfaces, and a peripheral upstanding lip for sliding and sealing engagement with a cylinder wall, said body comprising an outer portion including a plurality of layers of wire-reinforced fabric composed of yarns including a metal core member and an asbestos fibre covering, and an inner portion composed of non-reinforced asbestos fabric, said body carrying a yieldable rubber-like impregnant, and including ribs extending from the faces of said base.

7. A cup packing for assembly with a reciprocable piston including surfaces confining a portion of the cup packing therebetween, said cup packing comprising a unitary body including a base to be confined by said surfaces, and a peripheral upstanding lip for sliding and sealing engagement with a cylinder wall, said body comprising an outer portion including a plurality of layers of wire-reinforced fabric composed of yarns including a metal core member and an asbestos fibre covering, and an inner portion composed of non-reinforced asbestos fabric, said body carrying a yieldable rubber-like impregnant, and including concentric ribs extending from the faces of said base to reduce the area of contact of said surfaces and faces, and transverse ribs damming the valleys between said first-mentioned ribs, said ribs being composed substantially entirely of said yieldable rubber-like material.

GEORGE CHRISTENSON.